Feb. 5, 1929.                    W. M. ROWLES                    1,701,338
                                 ANIMAL FEEDER
                              Filed July 11, 1927            2 Sheets-Sheet 2
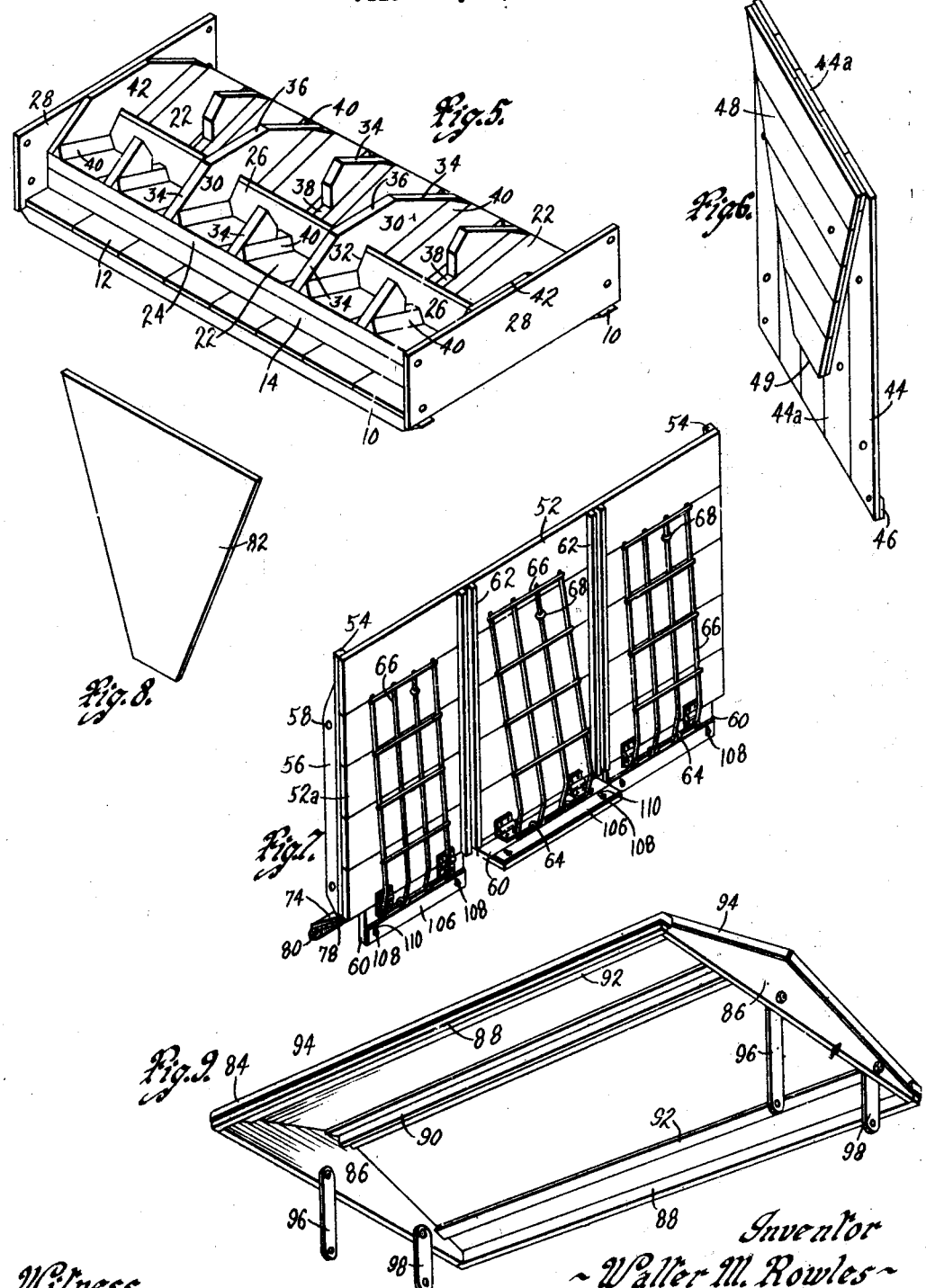

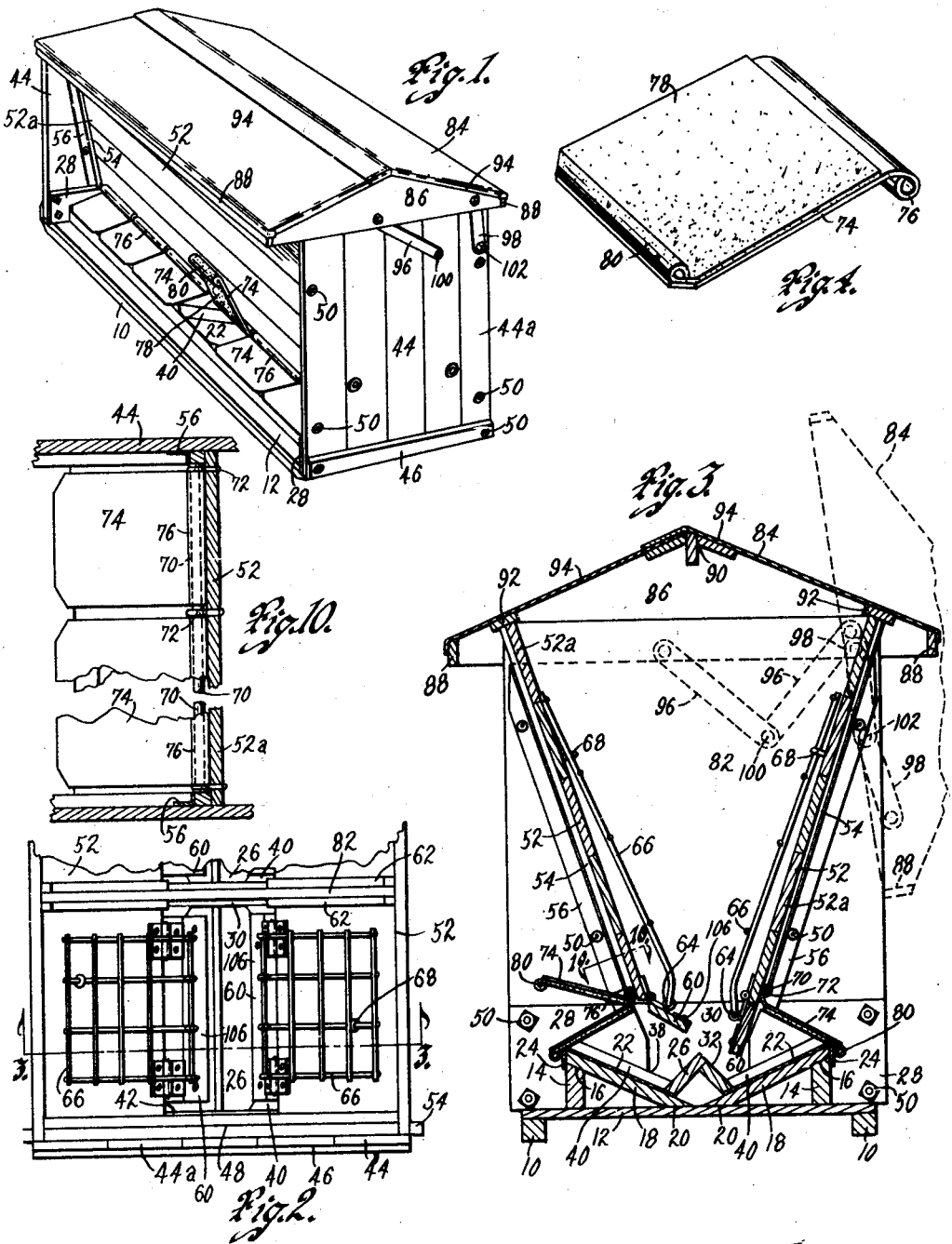

Patented Feb. 5, 1929.

1,701,338

UNITED STATES PATENT OFFICE.

WALTER M. ROWLES, OF ONAWA, IOWA.

ANIMAL FEEDER.

Application filed July 11, 1927. Serial No. 204,749.

The object of my invention is to provide a hog feeder of very simple, durable and inexpensive construction.

More particularly, it is my object to provide an animal feeder of the type adapted to be placed anywhere in the feeding house, which feeder is provided with one or more compartments for different kinds of feed, and is provided with troughs separated by bars or other means for keeping animals apart and provided respectively with tiltable covers or lids for protecting the feed in the trough compartments.

It is my purpose to provide such movable covers or lids of metal, such as galvanized iron with heat insulating linings and with protected means at their lower edges.

Another object of my present invention is to provide agitating means for the contents of the food hoppers.

Another purpose is to provide a feeder peculiarly adapted for storage and shipment in knock-down form and adapted to be conveniently and easily set up or taken apart. In connection with this feature, it is my purpose to provide a feeder having parts so constructed and arranged as to be peculiarly adapted for being shipped or stored in knock-down form and for being assembled into a complete feeder.

With these and other objects in view, my invention consists in the construction, arrangement and combination of the various parts of my animal feeder, whereby the objects contemplated are attained, as hereinafter more fully set forth, pointed out in my claims, and illustrated in the accompanying drawings, in which:

Figure 1 is a perspective view of an animal feeder embodying my invention.

Figure 2 is a top or plan view of one end of the feeder with the cover removed.

Figure 3 is a transverse and vertical sectional view taken on the line 3—3 of Figure 2.

Figure 4 is an inverted, plan view of one of the swinging cover members for a trough section.

Figure 5 is perspective view of the base as completed in the factory for assembling.

Figure 6 is a perspective view of one of the end members of the feeder.

Figure 7 is a perspective view of one side of the feeder with the feed agitators installed therein.

Figure 8 is a perspective view of one of the dividing partitions.

Figure 9 is a perspective view of the top of the feeder viewed from underneath; and Figure 10 is a detail, sectional view taken on the line 10—10 of Figure 3.

In the accompanying drawings, I have used the reference numeral 10 to indicate two skids arranged in parallel position lengthwise of the feeder for supporting it.

I prefer to build my feeder by completing what I will for convenience call the base in the factory.

I will now describe this base.

Supported on the skids 10 are cross members or boards 12 forming the bottom of the feeder. Supported on the bottom formed by the boards 12 are two longitudinally arranged strips 14, substantially spaced from each other and spaced inwardly in each instance from the side edges of the bottom.

The upper edges of the strips 14 are beveled as at 16. Resting upon each beveled edge 16 is a board 18, which extends lengthwise of the feeder and is inclined downwardly toward the central, longitudinal line of the feeder, as shown in Figure 2.

The lower edges of the boards 18 are beveled as at 20.

The exposed upper surfaces of the boards 18 are covered by sheets of sheet metal 22, as shown in Figure 2. The sheets of sheet metal 22 are bent downwardly over the upper edges of the boards 18 as at 24.

At the lower, central part of the trough is a raised member inclined outwardly toward both sides of the trough, as shown at 26. This member may be composed of a solid piece or of strips of board as shown.

At each end of the base, now being described, is secured an end wall member 28 as illustrated in Figure 5.

The members resting upon the boards 12 form troughs separated by the raised member 26 and extending lengthwise of the feeder on both sides thereof. These troughs are separated into sections by means of transverse, dividing members 30, resting on the metal sheets 22, as shown in Figure 5, and provided with suitable notches as at 32 to receive the raised central member 26.

The upper, outer ends of the members 30 are beveled upwardly and inwardly as shown at 34. The top edges of some of the members 30 are horizontal as at 36 to coact with the dividing partitions hereinafter referred to. Others of the members 30 have central notches in their upper edges as indicated at 38 for allowing free passage of food from trough section to trough section in the compartments between the different partitions of the feeder. Beveled strips 40 may be used at the lower edges of the members 30. (See Figure 5.)

At the ends of the trough, the end members 28 may be provided with liner plates or the like 42.

The base as above described is preferably manufactured in the factory and shipped as a unit.

At each end of the feeder is an end member 44, which may be made of upright boards 44ª connected at their lower edge by an outside binder strip 46. On the inner face of each end member 44 is a liner 48, preferably having generally the form of a triangle, with its base at the top and with its apex cut across horizontally as at 49 to rest on the end member 28 in the liner 42.

The side edges of the liner 48 serve as stops for the side wall members hereinafter referred to.

The end wall members 44 are secured to the end members 28 by means of removable bolts or the like 50. (See Figure 1.)

It will be understood that in the manufacture of my feeder, suitably sized and located holes are provided for the bolts.

In assembling the feeder from its knockdown to its completed form, the end walls 44 are bolted to the end members 28 and the side walls of the hopper are then installed in position. The side walls are indicated at 52. They may be made of any suitable material, but are preferably built of longitudinally arranged boards 52ª.

At each end of each side wall, there is provided on the outside of the side wall a substantially upright binder strip 54, to which is secured an angle 56, preferably of sheet metal. The angles 56 are provided with bolt holes 58 to receive bolts 50, such as have been described for fastening the side wall 52 to the end wall 44.

Hinged to the lower edge of each side wall 52, I arrange a plurality of agitator gates 60. There is one gate 50 for each hopper compartment of the completed feeder. The gates 60 are slightly spaced apart to allow for the members 30, which do not have the notches 38.

Arranged above and between each successive pair of gates on the inside of each wall 52 are guide strips 62 (see Figures 2 and 7) for receiving the hopper partition members hereinafter described.

Secured to the inner faces of the respective agitator gates 60 are aligned screw eyes 64, in which are received the lower transverse members of agitators 66, which are in the form of large-meshed screens or the like, and are arranged adjacent to the inner faces of the side members 52.

In the upper part of the inner faces of the side members 52 are screw eyes 68 in which some of the upright members of the agitator 62 are loosely and slidably mounted as shown in Figure 7.

It thus appears that when the gates 60 are swung on their pivots, the agitator members 66 will be operated. Their lower ends will be swung inwardly and upwardly when the gates 60 are swung inwardly and upwardly, and their upper ends will slide upwardly, and vice versa when the gates 60 are swung downwardly and outwardly, the lower ends of the agitators 66 will swing downwardly and outwardly and the upper ends will slide downwardly.

Suitably mounted on the outer, lower face of each side wall 52 is a transverse rod or shaft 70. The rod 70 is provided with suitable bearing members 72 at proper intervals corresponding to the positions of the trough divider members 30.

Pivotally mounted on each rod 70 is a plurality of trough covers 74, which may be made of sheet metal with a curled portion 76 at the upper edge to form a journal to receive the rod 70. There is one trough cover member 74 for each section of trough in each side of the feeder.

When the trough cover members 74 are made of metal, they are preferably lined on their under side with fiber or the like 78, which has a lower curled edge 80.

The parts are so constructed and arranged that when the covers are installed, the curled portions 80 will overhang the edges of the troughs, as shown in Figure 3, so that the hog in raising the trough cover will raise this curled portion instead of the sharp edge of the metal cover 74.

The side walls 52 and end walls 44 form a hopper, which may be divided into compartments by sliding partitions 82 into the guides 62.

I provide a cover or top for the feeder indicated generally at 84 in Figure 1 and shown in detail in Figure 9. This top comprises a frame having two triangular members 86 connected by longitudinal side frame members 88 and the central frame members 90 and intermediate longitudinal frame members 92. The top is covered with sheet metal 94.

Pivoted to the top and frame members 86 are links 96 and 98 adapted to be pivoted to the end wall members 44 by bolts 50, as at 100 and 102 for permitting the top to be swung from its ordinary position shown in Figure 3 to its dotted line position shown in that figure for thus allowing access to the interior of the hopper.

It should perhaps be mentioned that the frame members 92 shown in Figures 3 and 9 are so arranged that when the cover 84 is in its normal position, the members 92 rest on the upper edges of the side wall members 52.

On the inner faces of the agitator gates 60 at their lower edges are placed adjustable strips 106. These strips are fastened by means of screws 108 extended through elongated slots 110 in the strips and screwed into the agitator gates 60. By loosening the screws 108, the strips 106 may be adjusted for regulating the size of the opening from the lower end of the hopper into the trough.

In the practical assembling of the feeder, the end walls 44 are bolted to the base end members 28 by means of bolts 50, the side walls 52 carrying the agitators are then slipped into position, and the flanges of the angles 56 are bolted to the side walls 52. The partions 82 are then slipped into place for dividing the hopper into a series of compartments for different kinds of feed. The pivot bolts for the links 96 and 98 are then inserted through those links and through the holes provided therefor in the end walls 44 at 100 and 102.

In practical use, different kinds of feed may be placed in the different compartments of the hopper.

When an animal, such as a hog comes up to eat, he lifts one of the trough covers 74 with his nose and can then have access to a trough section.

The animals soon become accustomed to the device, and if feed is not delivered to the trough in sufficient quantities, the animal will move the agitator gate 60 for thus operating the agitator 66 and disturbing the feed in the hopper compartment, so that the feed will drop downwardly.

It may perhaps be noted that the bearing member 72 for the shaft 70 may be in the form of cotter pins extended through the wall 52, and that the shaft 70 may be provided with heads 104.

Changes may be made in the details of construction and arrangement of parts of my improved feeder without departing from the real purpose and scope of my invention, and it is my intention to cover by my claims, any modifications in structure, changes in arrangement, or use of mechanical equivalents, which may be reasonably included within their scope.

I claim as my invention:

1. In a feeder of the class described, a base comprising a platform-like portion, a trough formed on said platform-like portion having inclined side walls and a longitudinal, central raised member, transverse partitions in said trough, end wall members on said base, feeder end walls adapted to be detachably connected with said base end wall members having on their inner faces liners of the shape of a hopper end, side wall members, means for detachably connecting the side wall members with the feeder end walls, agitator gates pivoted to the lower edges of the side walls, agitators pivoted to said gates and extending upwardly along the inner faces of the side walls and slidably mounted thereon near their upper parts, and a cover.

2. In a feeder of the class described, a base comprising a platform-like portion, a trough formed on said platform-like portion having inclined side walls and a longitudinal, central raised member, transverse partitions in said trough, end wall members on said base, feeder end walls connected with said base, end wall members having on their inner faces liners of the shape of a hopper end, side wall members, means for connecting the side wall members with the feeder, end walls, agitator gates pivoted to the lower edges of the side walls, agitators pivoted to said gates and extending upwardly along the inner faces of the side walls and slidably mounted thereon near their upper parts, a cover, and a series of independently pivoted trough sections covered at the lower edge of each side wall member.

3. In a feeder of the class described, a base comprising a platform-like portion, a trough formed on said platform-like portion having inclined side walls and a longitudinal central raised member, transverse partitions in said trough, end wall members on said base, feeder end walls connected with said base end wall members having on their inner faces liners of the shape of a hopper end, side wall members, means for connecting the side wall members with the feeder end walls, said side wall members each having at its outer edge independently pivoted to it a series of trough section covers, and a feeder cover.

4. In a feeder of the class described, a base comprising a platform-like portion, a trough formed on said platform-like portion having inclined side walls and a longitudinal central raised member, transverse partitions in said trough, end wall members on said base, feeder end walls adapted to be detachably connected with said base end wall members having on their inner faces liners of the shape of a hopper end, side wall members, means for detachably connecting the side wall members with the feeder end walls, said side wall members each having at its outer edge independently pivoted to it a series of trough section covers, a feeder cover, and a rod on each side wall member, said trough section covers having journals mounted on said rod and being provided with non-heat conducting liners.

5. In a knock-down feeder of the kind described, a base comprising a platorm-like element having a longitudinally arranged trough thereon with walls inclined from its central medium line upwardly and laterally and having end wall members, feeder end walls, means for detachably connecting the feeder end walls to the base end walls, said feeder end walls having liners with inclined edges for serving as stops for the hopper side walls, hopper side walls resting on the base end walls and against said liners, means for detachably fastening the hopper side walls to the feeder end walls, and a cover detachably hinged to said end walls.

Des Moines, Iowa, June, 30, 1927.

WALTER M. ROWLES.